United States Patent
Osada et al.

(10) Patent No.: US 6,297,306 B1
(45) Date of Patent: Oct. 2, 2001

(54) SEMICONDUCTOR ENCAPSULATING EPOXY RESIN COMPOSITION AND SEMICONDUCTOR DEVICE

(75) Inventors: Shoichi Osada; Takayuki Aoki; Toshio Shiobara; Kazutoshi Tomiyoshi; Eiichi Asano, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/310,924

(22) Filed: May 13, 1999

(30) Foreign Application Priority Data

May 15, 1998 (JP) .................................. 10-152072

(51) Int. Cl.[7] .............................. C08K 3/10; C08K 9/00
(52) U.S. Cl. ..................... 524/406; 523/200; 523/424; 523/427
(58) Field of Search .................................. 523/200, 201, 523/210, 211, 451; 524/406

(56) References Cited

U.S. PATENT DOCUMENTS

| 2,766,139 | 10/1956 | Kayaba et al. . |
| 3,373,135 | 3/1968 | Jenkner et al. . |
| 3,398,019 | 8/1968 | Langguth et al. . |
| 4,632,946 | 12/1986 | Muench et al. . |
| 4,902,732 | 2/1990 | Itoh et al. . |
| 5,360,837 | 11/1994 | Honda et al. . |
| 5,407,471 | * 4/1995 | Rohr et al. .................. 106/14.44 |
| 5,434,199 | 7/1995 | Gallagher et al. . |
| 5,476,884 | 12/1995 | Kayaba et al. . |
| 5,567,749 | 10/1996 | Sawamura et al. . |
| 5,739,186 | 4/1998 | Hayakawa et al. . |

FOREIGN PATENT DOCUMENTS

| 09031160 | * 2/1997 | (JP) . |
| 111323088 | * 5/1999 | (JP) . |
| 11140166 | * 5/1999 | (JP) . |

OTHER PUBLICATIONS

Flame Retardanncy of Polymeric Materials vol. 1, pp. 24–38, pp. 52–61 (Marcel Pekker Inc., New York).

* cited by examiner

Primary Examiner—Edward J. Cain
Assistant Examiner—Katarzyna Wyrozebski-Lee
(74) Attorney, Agent, or Firm—Birch, Stewart, Kolasch & Birch, LLP

(57) ABSTRACT

An epoxy resin composition comprising (A) a biphenyl skeleton epoxy resin, (B) a biphenyl skeleton phenolic resin as a curing agent, (C) molybdenum compound, and (D) an inorganic filler is suited for semiconductor encapsulation since it is effectively moldable and cures into a part having improved reflow crack resistance, moisture resistance, and flame retardance. It does not pose a hazard to human health or the environment.

9 Claims, No Drawings

SEMICONDUCTOR ENCAPSULATING EPOXY RESIN COMPOSITION AND SEMICONDUCTOR DEVICE

This invention relates to an epoxy resin composition for semiconductor encapsulation which is effectively moldable and cures into a product having high-temperature storage stability, reflow crack resistance and flame retardance. It also relates to a semiconductor device encapsulated with a cured product of the composition.

BACKGROUND OF THE INVENTION

The current mainstream in the semiconductor industry resides in diodes, transistors, ICs, LSIs and VLSIs of the resin encapsulation type. Epoxy resins are generally used as the encapsulating resin because they have superior moldability, adhesion, electrical properties, mechanical properties, and moisture resistance to other thermosetting resins. It is thus a common practice to encapsulate semiconductor devices with epoxy resin compositions.

Recently, halogenated epoxy resins combined with antimony trioxide are often blended in epoxy resin compositions in order to clear the V-0 rating of Underwriters Laboratory flame retardant standard UL-94. This combination of a halogenated epoxy resin with antimony trioxide has great radical-trapping and air-shielding effects in the vapor phase, thus conferring a high fire-retarding effect. However, halogenated epoxy resins generate noxious gases during combustion, and antimony trioxide has powder toxicity. Given their negative impact on human health and the environment, these fire retardants are not suitable for resin compositions and it is desirable to entirely exclude these fire retardants from resin compositions.

In view of the above demand, studies have been conducted on the use of hydroxides such as $Al(OH)_3$ and $Mg(OH)_2$ or phosphorus-containing fire retardants in place of halogenated epoxy resins and antimony trioxide. Unfortunately, because of various problems associated with the use of these alternative compounds, such as inferior curability of the resin composition during molding and poor moisture resistance in the cured product, they are not yet ready for practical application.

SUMMARY OF THE INVENTION

An object of the invention is to provide an epoxy resin composition for semiconductor encapsulation which is effectively moldable and cures into a product having high-temperature storage stability, reflow crack resistance, flame retardance, and safety. Another object is to provide a semiconductor device encapsulated with a cured product of the composition.

The inventors have found that by blending a molybdenum compound as a flame retardant in an epoxy resin composition for semiconductor encapsulation comprising an epoxy resin of the following general formula (1), a phenolic resin curing agent of the following general formula (2), and an inorganic filler as essential components, there is obtained an epoxy resin composition which is effectively moldable and cures into a product having improved reflow crack resistance, moisture resistance, high flame retardance, and safety. Then a semiconductor device encapsulated with the cured epoxy resin composition remains highly reliable.

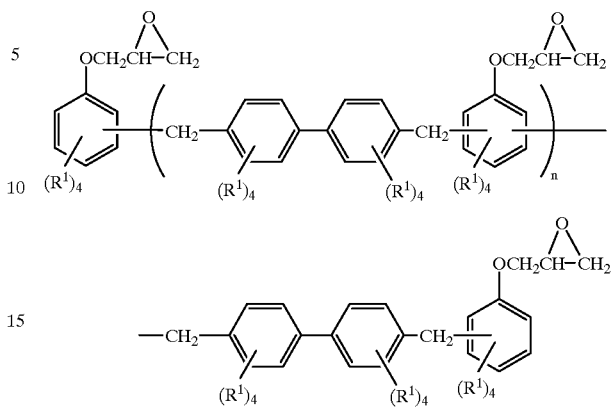

Herein $R^1$ which may be the same or different is a hydrogen atom, an alkyl group of 1 to 4 carbon atoms, or a phenyl group, and n is an integer of 0 to 10.

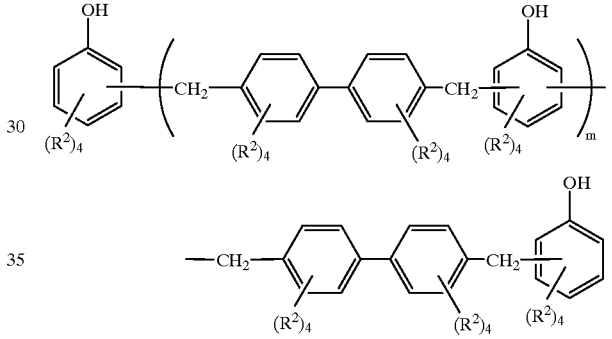

Herein $R^2$ which may be the same or different is a hydrogen atom, an alkyl group of 1 to 4 carbon atoms, or a phenyl group, and m is an integer of 0 to 10.

Molybdenum compound such as zinc molybdate by itself is known to have a smoke-reducing and charring effect in burning plastic. Like antimony trioxide, molybdenum compound is conventionally used in combination with halogenated resins. The inventors have found that by combining molybdenum compound with a heat resistant epoxy resin of formula (1) and a phenolic resin of formula (2), sufficient flame retardance is exerted without a need for halogenated resins. Since molybdenum compound is free of powder toxicity as found with antimony trioxide, and not detrimental to such properties as curing and moisture resistance, it is a very effective flame retardant to be blended in epoxy resin compositions.

Accordingly, the present invention provides an epoxy resin composition for semiconductor encapsulation comprising, in admixture, (A) an epoxy resin of formula (1), (B) a phenolic resin curing agent of formula (2), (C) molybdenum compound, and (D) an inorganic filler.

Also contemplated herein is a semiconductor device encapsulated with a cured product of the composition.

DETAILED DESCRIPTION OF THE INVENTION

In the semiconductor-encapsulating epoxy resin composition of the invention, both the epoxy resin of formula (1)

as component (A) and the phenolic resin curing agent of formula (2) as component (B) are resins having biphenyl and phenol skeletons, respectively. A combination of these resins affords a cured product having a low water absorption, high toughness and improved reflow crack resistance. The combination is a highly heat resistant material because of a high thermal decomposition initiating temperature and a low rate of thermal decomposition.

Component (A) is an epoxy resin of the following general formula (1), which is a phenolaralkyl type epoxy resin having a biphenyl skeleton or an epoxy resin having a biphenylaralkyl skeleton.

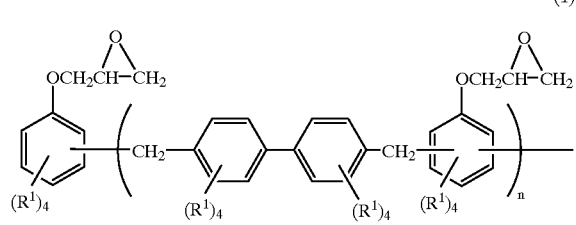
(1)

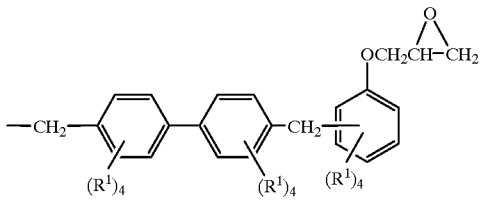
-continued

Herein, $R^1$ represents identical or different atoms or groups selected from the class consisting of a hydrogen atom, an alkyl group of 1 to 4 carbon atoms, and a phenyl group. Exemplary alkyl groups are methyl, ethyl, n-propyl, isopropyl, n-butyl, isobutyl, and t-butyl. Letter n is an integer of 0 to 10, preferably 0 to 4, and more preferably 0 to 2.

Illustrative examples of the epoxy resin of formula (1) are given below.

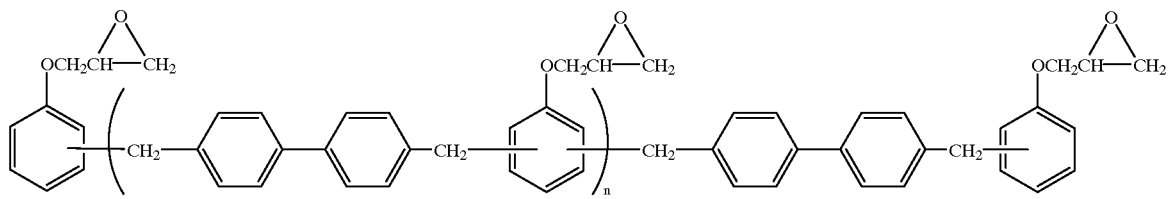
(1-1)

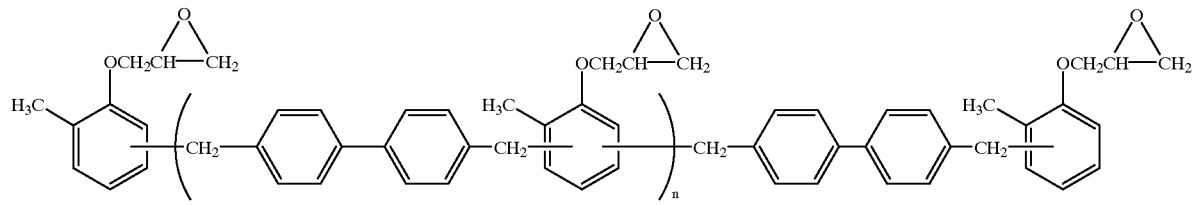
(1-2)

(1-3)

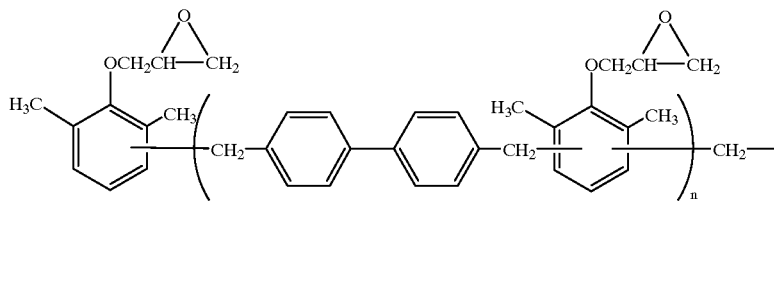

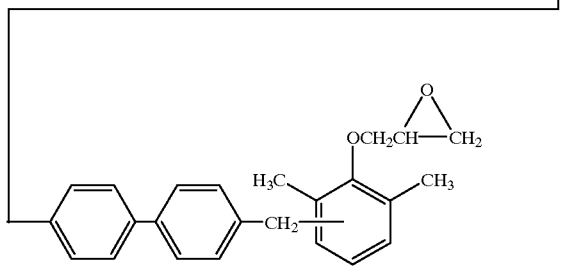

(1-4)

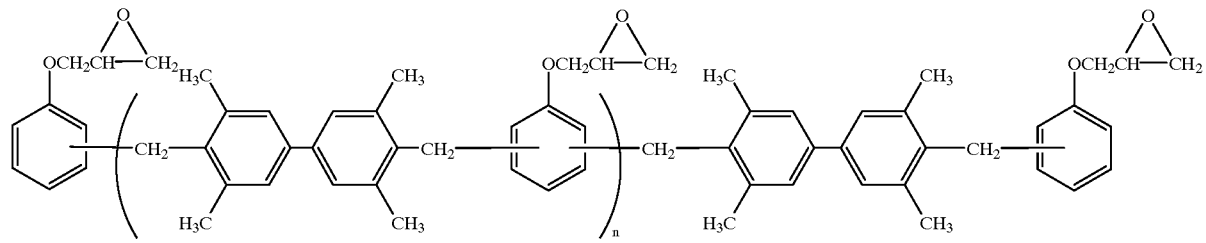

In the formulae, n is an integer of 0 to 10, preferably 0 to 4, and more preferably 0 to 2.

Desirably, the epoxy resin of formula (1) has a melt viscosity of 0.1 to 2.5 poises, especially 0.1 to 0.8 poise as measured at 150° C. by a cone plate type ICI viscometer. An epoxy resin with a melt viscosity of more than 2.5 poises would become extremely low in melt flow when the loading of inorganic filler is made as high as 80 to 90% by weight in order to improve reflow crack resistance. An epoxy resin with a melt viscosity of less than 0.1 poise tend to generate internal voids during molding, losing reliability.

As the epoxy resin, another epoxy resin may be used in combination with the epoxy resin of formula (1), if desired. Examples of the other epoxy resin which can be combined include novolac type epoxy resins such as phenol novolac type epoxy resins and cresol novolac type epoxy resins; triphenolalkane type epoxy resins such as triphenolmethane type epoxy resins and triphenolpropane type epoxy resins; biphenyl type epoxy resins; phenolaralkyl type epoxy resins free of a biphenyl skeleton; heterocyclic epoxy resins; naphthalene ring-containing epoxy resins; bisphenol type epoxy resins such as bisphenol A type epoxy resins and bisphenol F type epoxy resins, and stilbene type epoxy resins. These epoxy resins may be used alone or in admixture of two or more. Of these, biphenyl type epoxy resins, bisphenol A type epoxy resins, bisphenol F type epoxy resins, and stilbene type epoxy resins are preferable because they exhibit a low viscosity when melted.

The amount of the epoxy resin of formula (1) blended is desirably 50 to 100% by weight, more desirably 70 to 100% by weight based on the total weight of epoxy resins (that is, epoxy resin of formula (1) plus other epoxy resins). Less than 50% by weight of the epoxy resin of formula (1) would fail to achieve satisfactory reflow crack resistance and flame retardance.

Component (B) is a phenolic resin curing agent of the following general formula (2), which is an aralkyl type phenolic resin having a biphenyl skeleton or a phenolic resin having a biphenylaralkyl skeleton.

(2)

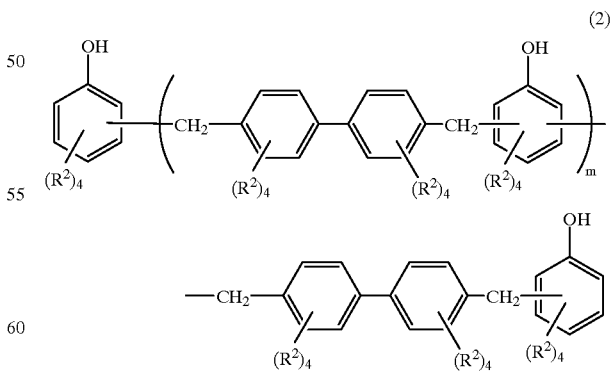

Herein, $R^2$ represents identical or different atoms or groups selected from the class consisting of a hydrogen atom, an alkyl group of 1 to 4 carbon atoms, and a phenyl group. Exemplary alkyl groups are methyl, ethyl, n-propyl, isopropyl, n-butyl, isobutyl, and t-butyl. Letter m is an integer of 0 to 10, preferably 0 to 4, and more preferably 0 to 2.

Illustrative examples of the epoxy resin of formula (1) are given below.

biphenyl skeleton; biphenyl type phenolic resins; triphenolalkane type phenolic resins such as triphenolmethane type phenolic resins and triphenolpropane type phenolic resins; alicyclic phenolic resins; heterocyclic phenolic resins; and bisphenol type phenolic resins such as bisphenol A type

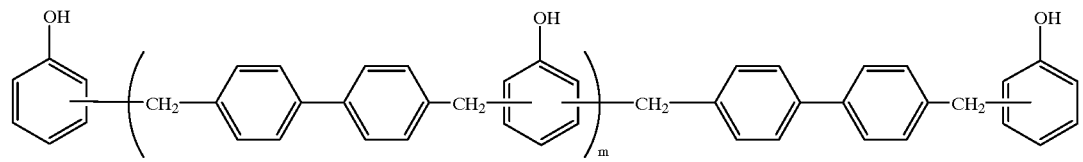

(2-1)

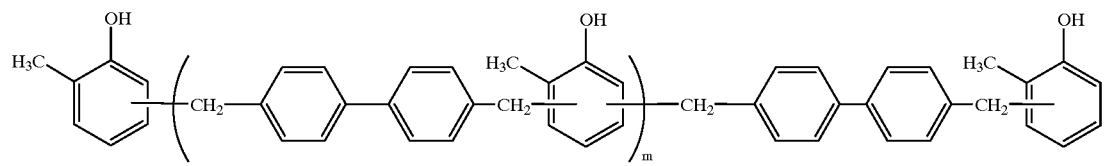

(2-2)

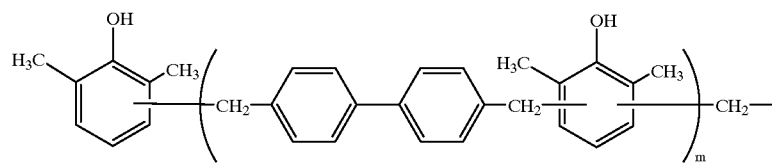

(2-3)

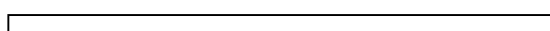

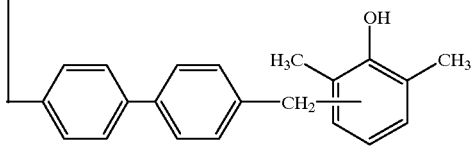

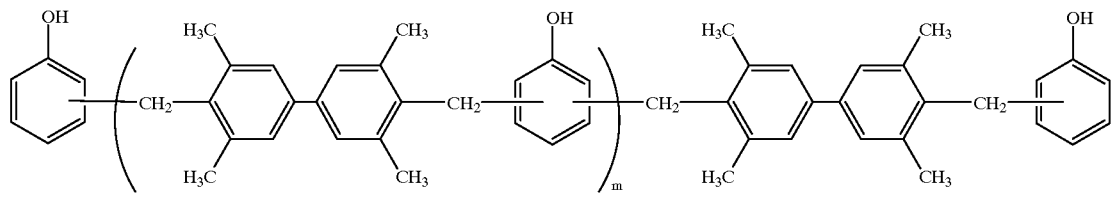

(2-4)

In the formulae, m is an integer of 0 to 10, preferably 0 to 4, and more preferably 0 to 2.

Desirably, the phenolic resin of formula (2) as the curing agent has a melt viscosity of 0.1 to 1.2 poises, especially 0.2 to 0.8 poise as measured at 150° C. by a cone plate type ICI viscometer. The reason of limitation is the same as described for the epoxy resin.

In the practice of the invention, another curing agent may be used in combination with the phenolic resin curing agent, if desired. Examples of the other curing agent include novolac type phenolic resins such as phenol novolac resins and cresol novolac resins; naphthalene ring-containing phenolic resins; phenolaralkyl type phenolic resins free of a phenolic resins and bisphenol F type phenolic resins. Any one or combination of two or more of these phenolic resins may be employed.

The amount of the phenolic resin curing agent of formula (2) blended is desirably 50 to 100% by weight, more desirably 70 to 100% by weight based on the total weight of phenolic resin curing agents (that is, phenolic resin of formula (2) plus other phenolic resins). Less than 50% by weight of the phenolic resin of formula (2) would fail to achieve satisfactory reflow crack resistance and flame retardance.

The epoxy resin (A) and the curing agent (B) are blended in any desired ratio and preferably in such a ratio that 0.5 to 1.5 mol, especially 0.8 to 1.2 mol of phenolic hydroxyl groups in all the phenolic resin curing agent in the composition is available per mol of epoxy groups in all the epoxy resin in the composition.

In the semiconductor-encapsulating epoxy resin composition of the invention, a molybdenum compound is blended as a flame retardant (C). The molybdenum compounds which can be used as component (C) include molybdenum oxides, molybdenum borides, molybdenum silicides, molybdenum esters, and molybdic acid salts such as molybdenum boride, molybdenum disilicide, molybdenum acetylacetonate, molybdenum (IV) oxide, molybdenum (V) oxide, molybdenum (VI) oxide, zinc molybdate, calcium molybdate carbonate, and calcium molybdate. Molybdenum compounds are known to have a smoke-reducing and charring effect in burning plastic. Like antimony trioxide, molybdenum compounds are conventionally used in combination with halogenated resins. The inventors have found that by combining a molybdenum compound with the epoxy resin (A) of the specific structure and the phenolic resin curing agent (B) of the specific structure, an excellent flame retardance of V-0 in accordance with UL 94 test is exerted without a need for antimony trioxide and halogenated resins. The molybdenum compounds are very safe flame retardants since they are free of powder toxicity as found with antimony trioxide, and do not evolve noxious gases as a result of pyrolysis. Among others, zinc molybdate is especially preferable since it is not detrimental to curing properties of epoxy resin compositions.

The molybdenum compound may be blended as such. However, it is desired that the molybdenum compound be uniformly dispersed in an epoxy resin composition in order to achieve a sufficient flame retardant effect. One effective means for improving dispersibility is to previously support a molybdenum compound (typically zinc molybdate) on a finely divided inorganic filler carrier (such as talc or spherical fused silica) whereupon the resulting molybdenum compound-carrying powder is blended with the other components of the composition. Such inorganic fillers include silicas such as fused silica and crystalline silica, talc, alumina, silicon nitride, aluminum nitride, boron nitride, titanium oxide, and glass fibers, with talc and spherical fused silica being advantageous because of good dispersibility in epoxy resins. Preferably the molybdenum compound (typically zinc molybdate) is supported on an inorganic filler carrier in an amount of 1 to 50% by weight, more preferably 5 to 40% by weight based on the molybdenum compound-carrying inorganic filler. Molybdenum compound contents of less than 1% by weight would fail to provide satisfactory flame retardance whereas contents of more than 50% by weight would detract from the curability and moldability (or flow) of the composition.

The molybdenum compound and molybdenum compound-carrying inorganic filler should preferably have a mean particle size of 0.1 to 20 $\mu$m, more preferably 0.2 to 10 $\mu$m, most preferably 0.5 to 3 $\mu$m, and a specific surface area of 0.5 to 50 m$^2$/g, more preferably 0.7 to 20 m$^2$/g as measured by the BET adsorption method. The mean particle size may be determined as the weight average value (median diameter) using a particle size distribution measurement apparatus based on the laser light diffraction technique. With too small a mean particle size or too large a specific surface, the molybdenum compound would be difficult to disperse in resin compositions. With too large a mean particle size or too small a specific surface, the molybdenum compound such as zinc molybdate would become difficult to be uniformly supported on the filler, which provides poor flame retardance. Typical zinc molybdate-carrying inorganic fillers are commercially available under the trade name of KEMGARD series such as KEMGARD 1260, 1261, 1270, 1271 and 911C from Sherwin-Williams.

The amount of the molybdenum compound (typically zinc molybdate) blended is preferably 0.1 to 30 parts by weight, more preferably 0.15 to 10 parts by weight, and most preferably 0.2 to 4 parts by weight, per 100 parts by weight of the epoxy resin (A) and the phenolic resin curing agent (B) combined. Less than 0.1 part by weight of the molybdenum compound would fail to achieve a sufficient flame retardant effect, whereas the use of more than 30 parts by weight would adversely affect the curability of the composition. It is noted that an appropriate amount of the inorganic filler having the molybdenum compound (typically zinc molybdate) carried thereon is about 0.5 to about 120 parts, more preferably about 1 to about 80 parts, especially about 1 to about 50 parts by weight per 100 parts by weight of the epoxy resin and the curing agent combined.

In the epoxy resin composition of the invention, an inorganic filler (D) is blended. It may be selected from inorganic fillers commonly used in conventional epoxy resin composition while the inorganic filler having the molybdenum compound carried thereon as component (C) is excluded from this component (D). Exemplary inorganic fillers include silicas such as fused silica and crystalline silica, alumina, silicon nitride, aluminum nitride, boron nitride, titanium oxide, and glass fibers.

No particular limits are imposed on the mean particle size and shape of the inorganic filler. Spherical fused silica having a mean particle diameter of 1 to 40 $\mu$m, especially 5 to 20 $\mu$m is preferable from the standpoints of molding and flow.

In order to enhance the bond strength between the resin and the inorganic filler, it is preferred to use the inorganic filler which has been surface treated with coupling agents such as silane coupling agents and titanate coupling agents. Exemplary coupling agents include epoxy-functional alkoxysilanes such as γ-glycidoxypropyltrimethoxysilane, γ-glycidoxypropylmethyldiethoxysilane, and β-(3,4-epoxycyclohexyl)ethyltrimethoxysilane, amino-functional alkoxysilanes such as N-β-(aminoethyl)-γ-aminopropyltrimethoxysilane, γ-aminopropyltriethoxysilane, and N-phenyl-γ-aminopropyltrimethoxysilane, and mercapto-functional alkoxysilanes such as γ-mercaptopropyl-trimethoxysilane. The amount of coupling agent used and the surface treating method are not critical.

An appropriate amount of the inorganic filler is about 400 to about 1,100 parts, especially about 600 to about 900 parts by weight per 100 parts by weight of the epoxy resin (A) and the curing agent (B) combined. Epoxy resin compositions loaded with less than 400 parts of the filler would have a high coefficient of expansion so that greater stresses may be applied to semiconductor devices to exacerbate the characteristics thereof, and fail to achieve the desired flame retardant properties because of a relatively large proportion of the resin component to the overall composition. Epoxy resin compositions loaded with more than 1,100 parts of the filler would have a too high viscosity during molding and be difficult to mold. When expressed in percent by weight, the inorganic filler preferably accounts for 75 to 92% by weight, especially 83 to 90% by weight of the composition.

In the practice of the invention, a curing accelerator is preferably blended to accelerate the curing reaction of the epoxy resin with the curing agent. Use may be made of any of curing accelerators that can promote the curing reaction, for example, organic phosphorus compounds such as triphenylphosphine, tributylphosphine, tri(p-methylphenyl) phosphine, tri(nonylphenyl)phosphine, triphenylphosphine-triphenylboran, and tetraphenylphosphonium-tetraphenyl borate; tertiary amine compounds such as triethylamine, benzyldimethylamine, α-methylbenzyldimethylamine, and 1,8-diazabicyclo[5.4.0]undecene-7; and imidazole compounds such as 2-methylimidazole, 2-phenylimidazole, 2-phenyl-4-methylimidazole, 2-ethylimidazole, 4-methylimidazole, 4-ethylimidazole, 2-phenyl-4-hydroxymethylimidazole, 2-ethyl-4-methyl-imidazole, 1-cyanoethyl-2-methylimidazole, 2-phenyl-4-methyl-5-hydroxymethylimidazole, and 2-phenyl-4,5-dihydroxymethylimidazole.

In the semiconductor-encapsulating epoxy resin composition of the invention, any of well-known additives may be blended, if necessary, for example, stress-reducing agents such as thermoplastic resins, thermoplastic elastomers, organic synthetic rubbers, and silicones; waxes such as carnauba wax, higher fatty acids, and synthetic waxes; colorants such as carbon black; and halogen trapping agents. These additives may be blended in conventional amounts insofar as the benefits of the invention are not impaired.

The epoxy resin composition of the invention may be prepared by blending the epoxy resin, curing agent, inorganic filler and other additives in accordance with a predetermined formulation, thoroughly and uniformly mixing these components in a mixer, melting and working the mixture in a hot roll mill, kneader or extruder, followed by cooling for solidification and grinding into a molding material of a suitable size.

The epoxy resin composition thus obtained can be effectively utilized as an encapsulant for a variety of semiconductor devices. Low-pressure transfer molding is the process most commonly used for encapsulation. Desirably, the epoxy resin composition of the invention is molded at a temperature of about 150 to 180° C. for about 30 to 180 seconds and post-cured at a temperature of about 150 to 180° C. for about 2 to 16 hours.

There has been described an epoxy resin composition for semiconductor encapsulation which is effectively moldable and cures into a product having improved reflow crack resistance, improved moisture resistance, and high flame retardance. Since halogenated epoxy resins and antimony trioxide are excluded, the resin composition of the invention is safe and not detrimental to human and the environment. Therefore, a semiconductor device encapsulated with the composition in a cured state remains highly reliable.

EXAMPLE

Examples of the invention are given below by way of illustration and not by way of limitation. All parts are by weight.

Examples 1–9 and Comparative Examples 1–4

The components shown in Tables 1 and 2 were uniformly melt mixed in a hot twin-roll mill, cooled and ground, obtaining epoxy resin compositions for semiconductor encapsulation. The components used are as follows.

Epoxy Resin (a) Epoxy resin of formula (1-1), NC3000P (Nihon Kayaku K.K.), epoxy equivalent 272, melt viscosity 0.8 poise as measured at 150° C. by a cone plate type ICI viscometer

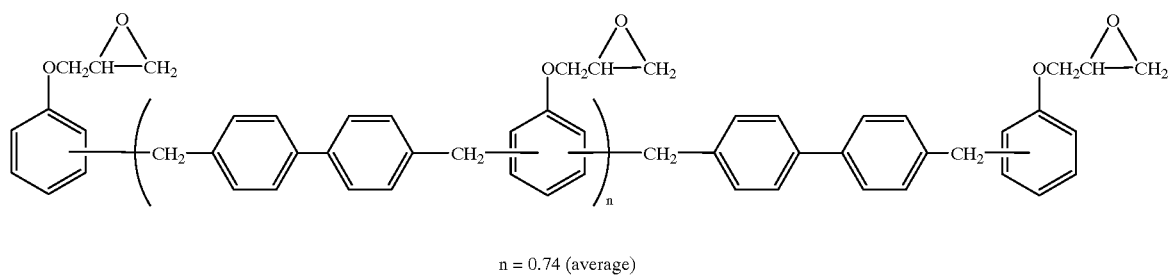

(1-1)

n = 0.74 (average)

(b) Biphenyl type epoxy resin, YX4000HK (Yuka Shell K.K.), epoxy equivalent 190

(c) o-cresol novolac type epoxy resin, EOCN1020-55 (Nihon Kayaku K.K.), epoxy equivalent 200 Curing agent:

(d) Phenolic resin of formula (2-1), MEH7851L (Meiwa Chemicals K.K.), phenol equivalent 199, melt viscosity 0.8 poise as measured at 150° C. by a cone plate type ICI viscometer

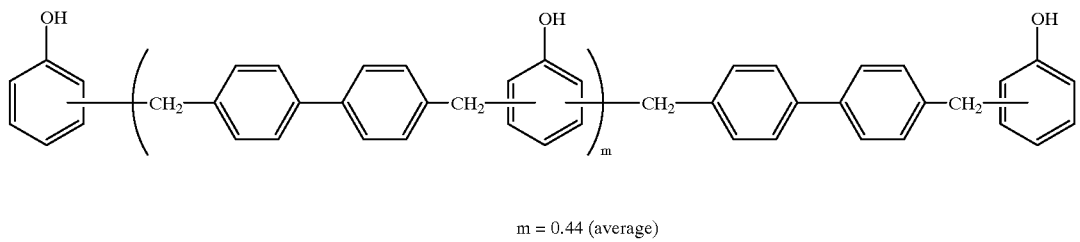

m = 0.44 (average)

(e) Phenolaralkyl resin, MEH780OSS (Meiwa Chemicals K.K.), phenol equivalent 175

Inorganic Filler
  Spherical fused silica with a mean particle diameter of 13 μm Curing Accelerator
  Triphenylphosphine Zinc Molybdate-carrying Talc
  Talc having a mean particle diameter of 0.8 μm, a specific surface area (by BET method) of 12 m²/g and a zinc molybdate content of 19% by weight Parting Agent
  Carnauba wax (Nikko Fine Products K.K.)

Silane Coupling Agent
  γ-glycidoxypropyltrimethoxysilane KBM403 (Shin-Etsu Chemical Co., Ltd.)

These compositions were measured for the following properties. The results are given in Tables 1 and 2.

(1) Spiral Flow
  Measured by molding at 175° C. and 70 kgf/cm² for a molding time of 120 seconds in a mold in accordance with EMMI standards.

(2) Hardness when Molded
  Using the method described in JIS-K6911, a rod measuring 10 ×4×100 mm was molded at 175° C. and 70 kgf/cm² for a time of 90 seconds. The hardness when hot was measured with a Barcol Impressor.

(3) Reflow Crack Resistance
  Eight flat package samples of 14×20×2.7 mm were molded. They were post-cured at 180° C. for 4 hours, kept for 168 hours in a thermostatic chamber at 85° C. and RH 85% for moisture absorption, and immersed in a solder bath at 240° C. for 30 seconds. The samples were observed for cracks on the outer surface. The number of cracked samples was counted.

(4) Flame Retardance
  A 1/16 inch thick sheet was molded and examined for flame retardance in accordance with UL 94 test specifications.

(5) Moisture Resistance
  A silicon chip measuring 6×6 mm on which aluminum wiring had been formed was adhesively bonded to a 14-pin dual in-line package (DIP) frame (Alloy 42), and the aluminum electrodes on the chip surface were wire bonded to the lead frame using gold wire with a diameter of 30 μm. The epoxy resin composition was then molded over the chip at 175° C. and 70 kgf /cm² for a time of 120 seconds, and post-cured at 180° C. for 4 hours. Twenty packages thus obtained were left to stand for 500 hours at 140° C. and 85% relative humidity while being subjected to a bias voltage of 5V DC. The number of packages in which aluminum corrosion arose was counted.

TABLE 1

| Composition (pbw) | E1 | E2 | E3 | E4 | E5 | E6 | E7 | E8 | E9 |
|---|---|---|---|---|---|---|---|---|---|
| Epoxy resin (a) | 57.83 | 57.83 | 57.83 | 57.83 | 57.83 | 57.83 | 38.38 | 62.94 | 42.98 |
| Epoxy resin (b) | — | — | — | — | — | — | 16.45 | — | 18.42 |
| Epoxy resin (c) | — | — | — | — | — | — | — | — | — |
| Phenolic resin (d) | 42.17 | 42.17 | 42.17 | 42.17 | 42.17 | 42.17 | 45.17 | 25.94 | 27.02 |
| Phenolic resin (e) | — | — | — | — | — | — | — | 11.12 | 11.52 |
| Inorganic filler | 700 | 500 | 700 | 1000 | 700 | 700 | 700 | 700 | 700 |
| Curing accelerator | 1.2 | 1.2 | 1.2 | 1.2 | 1.2 | 1.2 | 1.2 | 1.2 | 1.2 |
| Zinc molybdate-carrying talc | 1 | 5 | 5 | 5 | — | 10 | 5 | 5 | 5 |
| (zinc molybdate content, pbw) | 0.19 | 0.95 | 0.95 | 0.95 | — | 1.9 | 0.95 | 0.95 | 0.95 |
| Zinc molybdate | — | — | — | — | 0.95 | — | — | — | — |
| Aluminum hydroxide | — | — | — | — | — | — | — | — | — |
| Antimony trioxide | — | — | — | — | — | — | — | — | — |
| Brominated epoxy resin | — | — | — | — | — | — | — | — | — |
| Parting agent | 3 | 3 | 3 | 3 | 3 | 3 | 3 | 3 | 3 |
| Carbon black | 2 | 2 | 2 | 2 | 2 | 2 | 2 | 2 | 2 |
| Silane coupling agent | 1 | 1 | 1 | 1 | 1 | 1 | 1 | 1 | 1 |
| Spiral flow (cm) | 95 | 130 | 90 | 40 | 95 | 80 | 95 | 90 | 100 |
| Hardness as molded | 75 | 70 | 78 | 85 | 75 | 75 | 80 | 80 | 83 |
| Flame retardance | V-0 | V-0 | V-0 | V-0 | V-0 | V-0 | V-0 | V-0 | V-0 |
| Solder cracking | 0/8 | 0/8 | 0/8 | 0/8 | 0/8 | 0/8 | 0/8 | 1/8 | 2/8 |
| Moisture resistance | 0/20 | 0/20 | 0/20 | 0/20 | 0/20 | 0/20 | 0/20 | 0/20 | 0/20 |

(pbw: parts by weight)

TABLE 2

| Composition (pbw) | CE1 | CE2 | CE3 | CE4 |
|---|---|---|---|---|
| Epoxy resin (a) | 57.83 | — | 57.83 | 57.83 |
| Epoxy resin (b) | — | — | — | — |
| Epoxy resin (c) | — | 59.42 | — | — |
| Phenolic resin (d) | 42.17 | — | 42.17 | 42.17 |
| Phenolic resin (e) | — | 30.48 | — | — |
| Inorganic filler | 700 | 450 | 700 | 700 |
| Curing accelerator | 1.2 | 1.2 | 1.2 | 1.2 |
| Zinc molybdate-carrying talc | — | 5 | — | — |
| (zinc molybdate content, pbw) | — | 0.95 | — | — |
| Zinc molybdate | — | — | — | — |
| Aluminum hydroxide | — | — | — | 50 |
| Antimony trioxide | — | — | 4 | — |
| Brominated epoxy resin | — | — | 6.2 | — |
| Parting agent | 3 | 3 | 3 | 3 |
| Carbon black | 2 | 2 | 2 | 2 |
| Silane coupling agent | 1 | 1 | 1 | 1 |
| Spiral flow (cm) | 90 | 110 | 90 | 70 |
| Hardness as molded | 75 | 85 | 75 | 30 |
| Flame retardance | V-1 | burned | V-0 | V-0 |
| Solder cracking | 0/8 | 8/8 | 0/8 | 1/8 |
| Moisture resistance | 0/20 | 0/20 | 20/20 | 20/20 |

As seen from Tables 1 and 2, the epoxy resin compositions within the scope of the invention are easy to mold and produce cured parts having improved reflow crack resistance, improved moisture resistance, and high flame retardant rating. They have no ill effects on human health and the environment and are safe since they contain no halogenated epoxy resins or antimony trioxide.

Japanese Patent Application No. 152072/1998 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A semiconductor encapsulating epoxy resin composition free from halogenated epoxy resins, antimony trioxide, and aluminum hydroxide, said resin comprising (A) an epoxy resin of the following general formula (1):

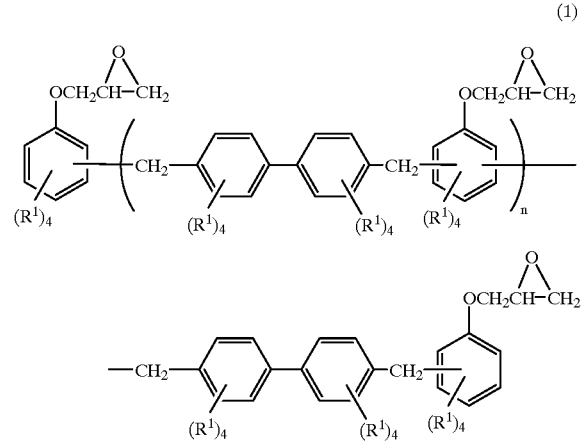

wherein $R^1$ which may be the same or different is a hydrogen atom, an alkyl group of 1 to 4 carbons atoms, or a phenyl group, and n is an integer of 0 to 10, (B) a phenolic resin curing agent of the following general formula (2):

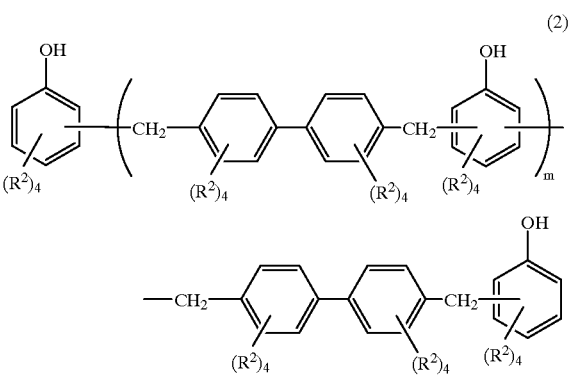

wherein $R^2$ which may be the same or different is a hydrogen atom, an alkyl group of 1 to 4 carbons atoms, or a phenyl group, and m is an integer of 0 to 10, (C) a molybdenum compound, and (D) an inorganic filler.

2. The epoxy resin composition of claim 1 wherein 0.1 to 30 parts by weight of molybdenum compound (C) and 400 to 1,100 parts by weight of inorganic filler (D) are present per 100 parts by weight of epoxy resin (A) and curing agent (B) combined.

3. The epoxy resin composition of claim 1 wherein the epoxy resin of formula (1) has a melt viscosity of 0.1 to 2.5 poises as measured at 150° C. by a cone plate type ICI viscometer.

4. The epoxy resin composition of claim 1 wherein the phenolic resin of formula (2) has a melt viscosity of 0.1 to 1.2 poises as measured at 150° C. by a cone plate type ICI viscometer.

5. The epoxy resin composition of claim 1, wherein the molybdenum compound is selected from the group consisting of molybdenum oxides, molybdenum borides, molybdenum suicides, molybdenum esters, molybdic acid salts, and mixtures thereof.

6. The epoxy resin composition of claim 5, wherein the molybdenum compound is zinc molybdate.

7. The epoxy resin composition of claim 1, wherein the molybdenum compound is blended in the form of a molybdenum compound-carrying powder in which the molybdenum compound is supported on a finely divided inorganic filler.

8. The epoxy resin composition of claim 1, having a UL 94 flame retardance of V-0.

9. A semiconductor device encapsulated with the epoxy resin composition of any one of claim 1–8 in a cured state.

* * * * *